Oct. 14, 1941.  W. B. PAYNE  2,258,799
SHEET ALIGNING AND FEEDING APPARATUS
Filed June 18, 1937  6 Sheets-Sheet 1

INVENTOR
Walter B. Payne
BY Cumpston & Shepard
his ATTORNEYS

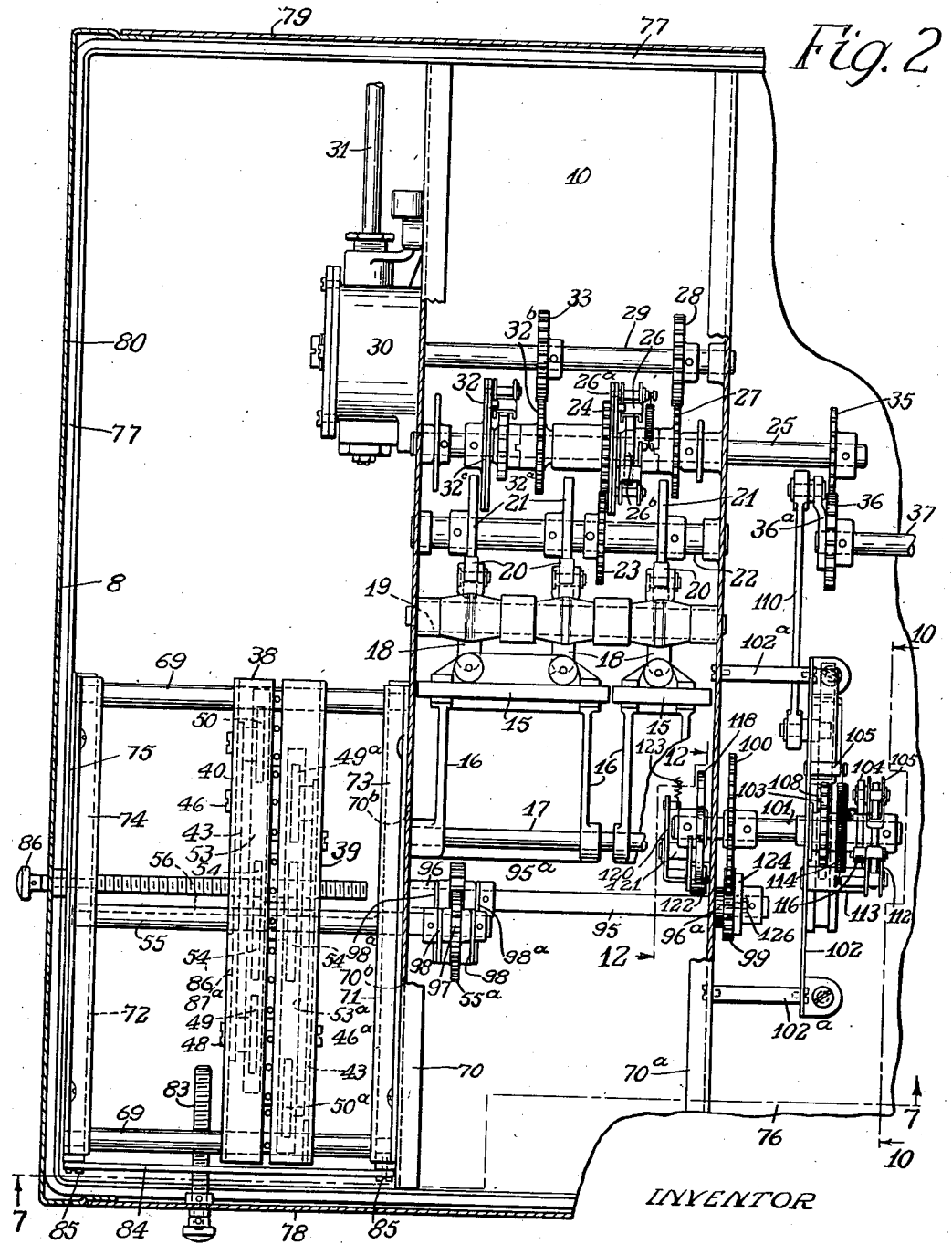

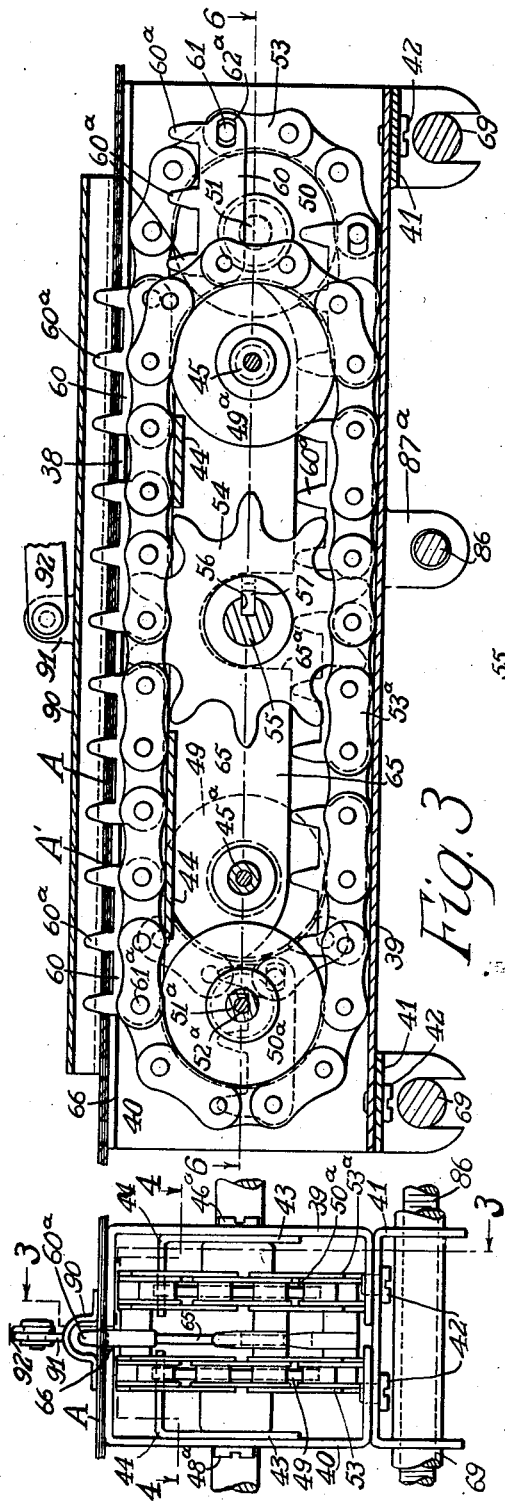

Oct. 14, 1941.   W. B. PAYNE   2,258,799
SHEET ALIGNING AND FEEDING APPARATUS
Filed June 18, 1937   6 Sheets-Sheet 4
Fig. 7
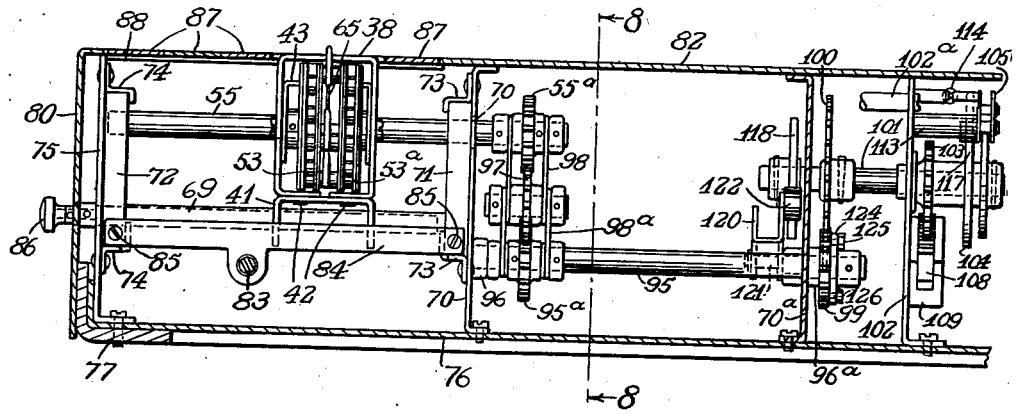
Fig. 8
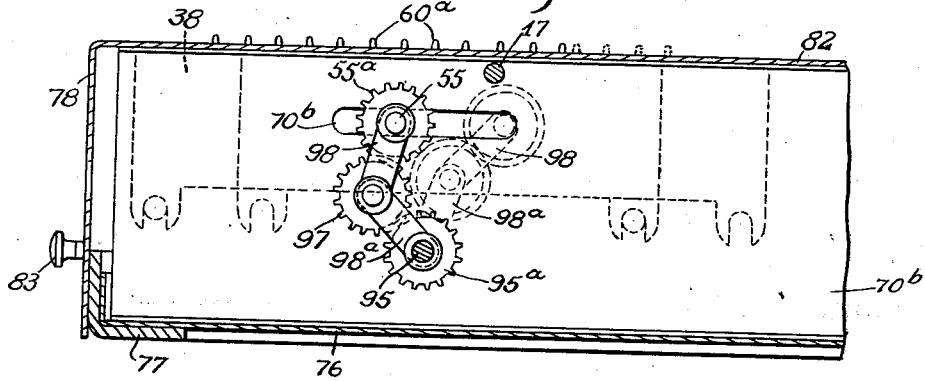
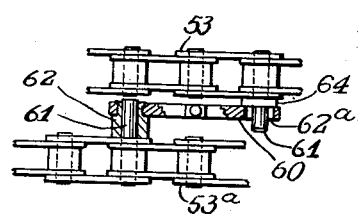
Fig. 9
INVENTOR
Walter B. Payne
BY
His ATTORNEYS Oct. 14, 1941.                W. B. PAYNE                2,258,799
                    SHEET ALIGNING AND FEEDING APPARATUS
                        Filed June 18, 1937            6 Sheets-Sheet 5

INVENTOR
Walter B. Payne
BY Cumpston & Shepard
his ATTORNEYS

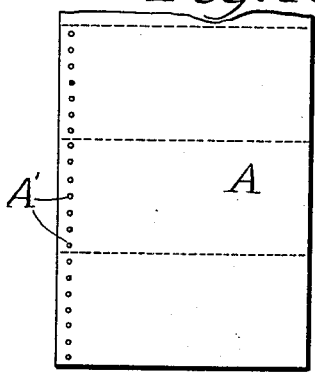
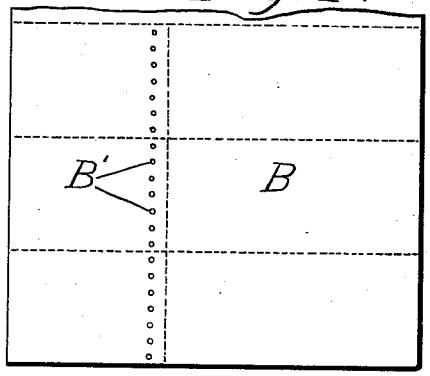
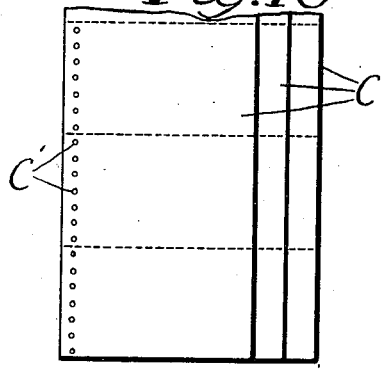
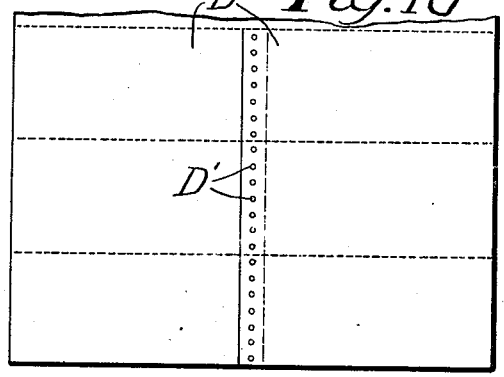
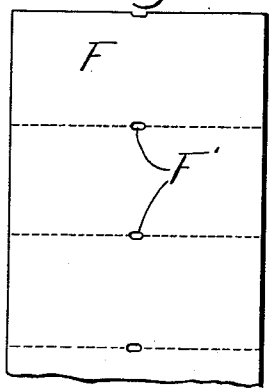
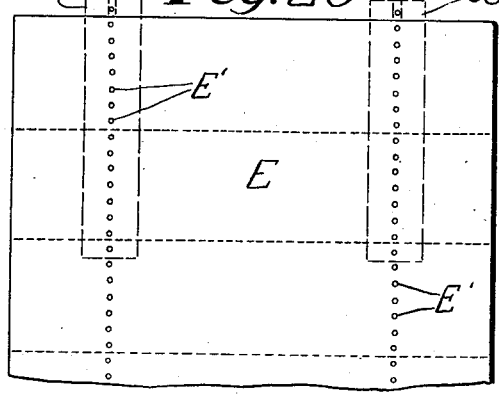

Patented Oct. 14, 1941

2,258,799

UNITED STATES PATENT OFFICE 2,258,799

SHEET ALIGNING AND FEEDING APPARATUS

Walter B. Payne, Rochester, N. Y., assignor to The Todd Company, Inc., Rochester, N. Y., a corporation of New York Application June 18, 1937, Serial No. 148,973

34 Claims. (Cl. 271—2.1)

The present invention relates to sheet feeding and aligning apparatus, and more particularly to an improved device for feeding perforated sheets, such for example, as checks, drafts, bills of lading, sales slips, and various other sheets or forms to cutting, printing or character applying machines of different types.

One object of the invention is to provide in a device of this class improved sheet feeding means for advancing either a single or a plurality of superimposed perforated sheets and including parts for engaging the sheets within the perforations which are adapted to advance and align the sheets in order that the forms, lines or markings of the superimposed sheets will be maintained in registry or in a predetermined relation during movement of the sheets to or through the machine for applying the characters thereto or for otherwise operating thereon.

A further object of the invention is to so construct and operate the sheet feeding means that the parts for engaging the sheets within the perforations thereof may be moved into and out of the same without tearing or marring the sheets and which will serve to hold the sheets in alignment or against lateral displacement during advancement of the same.

A further object of the invention is to provide an improved unitary sheet feeding device of the class described which can be readily mounted for use in connection with various types of machines, to which it may be desired to feed the perforated sheets, and one which is adapted for feeding sheets having the perforations at either side thereof or at different points spaced therefrom.

A further object of the invention is to provide one or more improved sheet feeding units of the class described, in combination with a printing, character applying, sheet cutting or other type of machine having operating means for actuating the sheet feeding means, together with means for adjusting the units relative to such machines as well as means for adjusting the sheet advancing elements of the units in their plane of operation.

The invention further has for its object to provide an improved arrangement of parts by which different types of machines and the sheet feeding mechanisms can be readily combined and properly coordinated and adjusted one relative to another and in which the feeding mechanism is adapted to accommodate sheets of different sizes.

A further object of the invention is to provide improved feeding means for a plurality of superimposed perforated sheets embodying a plurality of parts for engaging the sheets within the perforations thereof to advance the sheets in a predetermined direction and having operating means for moving the same in a plane and for maintaining said parts in substantially perpendicular relation to the portion of the sheet or sheets with which said parts cooperate during movement thereof into and out of the perforations.

A further object of the invention is to provide in apparatus of the class described, a simplified, practical and efficient device for feeding perforated sheets through engagement of certain moving parts of the device within the perforations, either of a single sheet or of superimposed sheets of equal or different widths.

To these and other ends the invention resides in certain improvements and combinations of parts, all as will be hereinafter more fully described, the novel features being pointed out in the claims at the end of the specification.

In the drawings:

Fig. 2 is a fragmentary, sectional plan of the machine shown in Fig. 1, illustrating the means for operating and adjusting the unit provided for feeding the sheets or webs of forms through the machine;

Fig. 3 is a longitudinal section through the sheet feeding unit taken substantially on line 3—3 of Fig. 5;

Fig. 4 is a horizontal section substantially on line 4—4 of Fig. 5;

Fig. 5 is an end elevation as viewed from the left of Fig. 3;

Fig. 7 is a fragmentary transverse sectional elevation substantially on line 7—7 of Fig. 2;

Fig. 8 is a fragmentary longitudinal sectional elevation substantially on line 8—8 of Fig. 7;

Fig. 9 is a fragmentary part sectional plan illustrating the manner of connecting the sheet feeding links with the chains or carriers for advancing the same;

Fig. 16 is a view of a web of forms provided with perforations along one edge only;

Fig. 17 is a view of a web of forms including a plurality of sheets having stubs in which the perforations are disposed away from the margin thereof;

Fig. 18 is a view showing a plurality of webs of superimposed forms of different widths in which the perforations are in registry to permit the forms to be simultaneously advanced while in superimposed relation as shown;

Fig. 19 is a view showing two webs of forms having adjacent overlapping edge portions with the perforations thereof in registering relation whereby the forms may be aligned and advanced simultaneously as a unit;

Fig. 20 is a view of a web of forms provided with two rows of perforations, beneath each of which is shown by dotted lines one of the feeding units, the units being coordinated to simultaneously advance the forms;

Fig. 21 is a view of a modified web of forms having perforations centrally disposed on the weakened lines provided to facilitate tearing the sheets one from another, and Fig. 22 is a view of a portion of an endless carrier having parts spaced to successively engage the web of forms shown in Fig. 21 in the perforations thereof during advancement of the forms.

The same reference numerals throughout the several views indicate the same parts.

Figure 1:
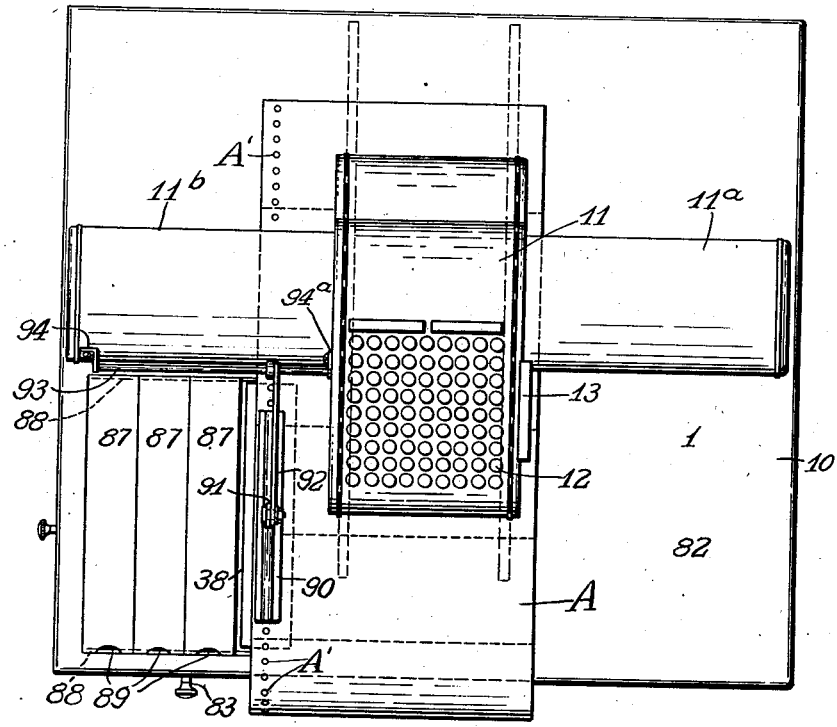
Fig. 1 is a plan view of a machine for printing predetermined subject matter on various forms, such, for example, as checks, drafts, commercial forms and the like, and to which is shown applied improved means for feeding the same.

The present invention is applicable to printing, performing, cutting, or manifolding machines of different types such as check writing, check signing, and sheet cutting machines, typewriters, accounting and adding machines, autographic registers and billing and other machines, or mechanisms adapted to perform one or more operations on a sheet made up of one or more forms, or of a continuous sheet or web, or a plurality of the same disposed in superimposed relation. One example of the usage of the present invention is illustrated by the drawings in which my improved sheet feeding means is shown connected with a conventional form of check writing or printing machine, such as that illustrated and described in my copending application, Serial No. 121,848, filed January 22, 1937.

Referring to the drawings, 10 designates generally a printing machine such as that embodied in said application including a housing 11 for the printing mechanism thereof, not shown. The keyboard of the check writer is indicated by the reference numeral 12 and the trip bar is shown at 13 which when depressed is adapted to condition the operating mechanism, as described hereinafter, a portion of which is contained within the U-shaped casing 11a extending laterally from the casing 11, Fig. 1.

The impression mechanism, which corresponds to that described in the above mentioned application, comprises one or more platen bars 15 pivotally supported by suitable arms 16 carried by a rod 17 as shown in Fig. 2. The platen bars 15 are actuated by levers 18 mounted on a transverse rod 19. The levers 18 are provided with rollers 20 for engagement with the platen cams 21 on a shaft 22, provided with a driving gear 23. The gear 23 is driven by a gear 24 loose on a shaft 25, which is rigid with a disk 26a of the impression clutch, designated generally by the reference numeral 26. The impression clutch 26 is provided with a clutch dog adapted to be engaged with a toothed member 26b operatively connected with a gear 27 loose on the shaft 25 and meshing with a driving gear 28 pinned on the main driving shaft 29.

The impression clutch mechanism 26 is arranged to be tripped automatically by means actuated by the type positioning clutch 32 just prior to the completion of the first half of its cycle of operation, whereby the impression mechanism is placed in operation after the type is positioned at the printing line.

After the impression clutch 26 has operated on the impression mechanism, means operated thereby, near the end of its cycle of operation, will automatically trip the type positioning clutch 32. The clutch 32 is then again connected with the driving means to complete its cycle of operation and to actuate the mechanism operatively connected therewith for returning the parts to normal position. The shaft 25, driven by the type positioning clutch 32, has a gear 35 pinned thereon which meshes with a gear 36 on a shaft 37 for controlling the operating means for moving the type to and from the printing line of the machine, as described in my copending application, referred to above.

Depression of the trip bar 13 will effect cooperative engagement between a clutch dog of the type positioning clutch 32 and the toothed member 32a. The member 32a is operatively connected with a gear 32b loose on the shaft 25, Fig. 2. The gear 32b meshes with the driving gear 33 pinned on the main driving shaft 29, actuated by a worm gear, not shown, but contained in the housing 30 and operated by the motor driven shaft 31. A disk 32c of the type positioning clutch 32 is pinned on the shaft 25 to effect rotation of the same during each cycle of operation of said clutch.

The type positioning clutch is arranged to move substantially through a half cycle of operation to position the type at the printing line in accordance with the keyboard setting, said clutch being then temporarily disconnected and the parts associated therewith, including the shaft 25, being held stationary at off-normal position. Connected with the gear 36 is a crank arm 36a for operating means provided for actuating the feeding device described hereinafter. The crank arm is arranged to move in one direction during the initial rotation of the shaft 25 by the clutch 32 to move the operating mechanism for the feeding device to a predetremined position, at which it will remain until the impression has been made on the check after which the clutch 32 will complete its cycle of operation, during which time the feed mechanism will be actuated to advance the sheet or web a predetermined distance. In this manner the next succeeding form is positioned at the printing line ready to receive an impression.

Figure 6:
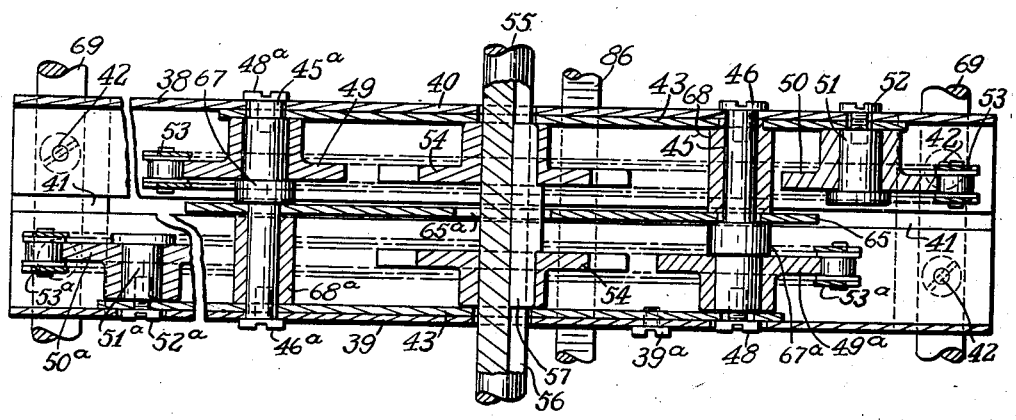
Fig. 6 is a horizontal section substantially on line 6—6 of Fig. 3.

The construction of the feeding unit, designated generally by the reference numeral 38, is best shown in Figs. 3 to 6, inclusive, and comprises a pair of channel-shaped sections 39 and 40, connected in the present embodiment to form a casing or housing for the sheet advancing means. The channels are preferably connected by a pair of U-shaped brackets 41, each of which is detachably connected with the lower flanges of the channels preferably by means of screws 42, Figs. 3 and 5. Secured on the inner face of each channel is an angle bar 43, each of the bars being provided with an inwardly extending flange 44, said flanges being provided for a purpose described hereinafter. Extending transversely between the channels 39 and 40 are a pair of pins 45 and 45a of somewhat similar construction. However, provision is made so that the channel 39 may be readily detached when desired to facilitate repairs, and reapplied after the remaining parts have been properly assembled. As shown in Fig. 6 the pin 45a is reduced at one end, said end being extended through the channel 40 and the angle bar 43, and interiorly threaded to receive a screw 48a. The opposite end of pin 45a extends through an opening in the channel 39 and the opposite angle bar 43, said end being interiorly threaded to receive a screw 46a. The pin 45 has one end extended through the channel 40 and interiorly threaded to receive a screw 46. The opposite end of the pin 45 has an enlarged portion which terminates adjacent the inner face of the angle bar 43, said end being interiorly threaded to receive a screw 48 which extends through an opening in the angle bar 43. The channel 39 is provided with an opening to accommodate the head of the screw 48, as shown in Fig. 6. A screw 39a serves to connect the channel 39 and the angle bar 43. It will be seen that by removing the screws 42 which connect the channel 39 to the brackets 41 and then removing the screws 39a and 46a that the channel 39 may be readily removed from the unit, after which the pins 45 and 45a and the parts carried thereby will be held in position on the channel 40 by the screws 46 and 48a. Rotatably mounted on the enlarged ends of the pins 45 and 45a are supporting disks 49 and 49a, respectively, provided for a purpose described hereinafter, similar supporting disks 50 and 50a being disposed in the housing formed by the channels. The disk 50 is supported by a pivot pin 51 secured by a screw 52 extending through the channel 40 and the vertical portion of one of the angle bars 43, as best shown in Fig. 6. The disk 50a is supported on a pivot pin 51a secured by a screw 52a which extends through the vertical portion of the other angle bar 43, the head of the screw being disposed in an opening formed in the channel 39 to permit the latter to be detached in the manner previously described, and for the purpose stated.

Mounted on the supporting disks 49 and 50 is a continuous carrier 53 and on the disks 49a and 50a is a similar continuous carrier 53a, said carriers each being preferably in the form of a chain constructed of a series of pivotally connected links, as best shown in Figs. 3 and 4. The chains are each operated by a sprocket 54 mounted for a sliding movement on a driven shaft 55 extending transversely through the side walls of the channels and having a longitudinally extending groove 56 for a key 57 by which the sprockets are driven upon rotation of the shaft.

The inwardly extending flanges 44 of the angle bars 43 are cut away at their centers to provide clearance for the sprockets, as shown in Fig. 3. The inwardly extending flanges of said angle bars support the upper flights of the endless carriers and are arranged to clear the supporting disks on which the carriers are mounted.

Figure 13:
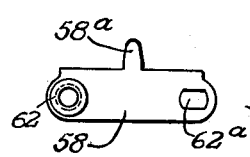
Fig. 13 is a detailed view of a sheet feeding member having a single part for engaging the sheet in the perforations thereof.
Figure 14:
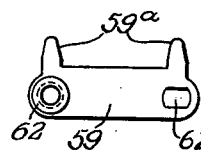
Fig. 14 is a similar view in which the link is provided with a pair of sheet engaging parts.
Figure 15:
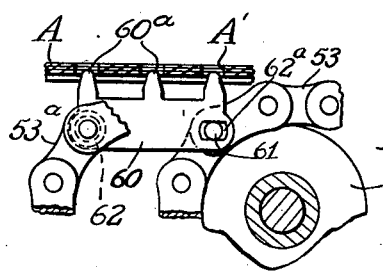
Fig. 15 is a fragmentary part sectional elevation showing one of the sheet feeding links connected with the endless carriers and the position to which it is moved to cause the sheet advancing parts to take into the perforations of the sheet.

The means connected with the endless chains 53 and 53a for advancing the perforated sheets preferably comprises a series of links or other suitable feeding elements which may be constructed in any suitable manner or as indicated either at 58, 59, or 60 in Figs. 13, 14, and 15, respectively. The link 58 has a single part 58a for engaging the sheet A in the perforations A' thereof while the link 59 has two sheet engaging portions 59a, the link 60 being provided with three such parts 60a.

The sheet engaging and advancing links or elements are apertured at one end to receive the extended portions 61 of the pivot pins of certain of the links of the chains 53 and 53a, as shown in Fig. 9. The opposite end of each of the sheet engaging and advancing links 60 is connected with a bushing 62, disposed on the extensions of the pivot pins of the chain 53a. The aperture within the other end of the link through which the extension 61 of the pivot pin of the chain 53 is projected is elongated, as shown at 62a, for a purpose which will appear hereinafter. The pivot pin 61 of the chain 53 is provided with a part 64 which serves to properly space the link with relation to the chain 53, as shown in Fig. 9. The sheet advancing links or elements are each preferably equal in length to the combined lengths of two of the links of the chain and the pivot pin of every third chain link is extended to receive one end of a sheet advancing link regardless of whether the links shown either in Figs. 13, 14, or 15 are used.

It will be noted from Figs. 3, 4 and 6 that one of the endless chains or carriers is advanced with respect to or positioned ahead of the other, which is accomplished by positioning the rotary supporting disks 49 and 50 of one chain in advance of the corresponding rotary disks of the other chain. It will also be noted that the length of each of the sheet feeding links corresponds substantially to the distance one of the endless carriers is advanced relative to the other. This construction serves to maintain the sheet feeding links in parallel relation each with respect to the others in all positions of the links. In other words, the links either when moving upwardly or downwardly in their plane of travel will not only remain in parallel relation but also substantially in parallel relation to the portion of the sheet overlying the housing, or that portion in the perforations of which the projecting pins or parts 60a of the links 60 are extended, as shown in Fig. 3. The advantage of this is that the feeding pins or projections 60a will remain at right angles to said positions of the sheet when approaching and moving into and out of the perforations A' so that accurate centering of the pins relative to the perforations in advance of their projection therein and maintenance of the same in true alignment therewith during movement into and out of the same is assured. This would not be the case if the pins or projections were moved on the arc of a circle upon entering and leaving the perforations of the sheets, a method heretofore employed in the movement of the pins into and out of the perforations of the sheets.

With this method, the angular relation of the pins relative to the sheet and the perforations therein will change constantly during movement of the pins toward and into and out of the perforations. Furthermore the pins upon approaching the perforations will engage the sheet and will have a tendency to lift or displace the same and under certain conditions will fail to enter or become properly centered relative to the perforations, this being particularly true when a plurality of sheets are superimposed one upon another and the corresponding perforations are not in exact registry or alignment as is sometimes the case.

However, with the present method of maintaining the feeding pins at right angles to the sheets during movement of the same into and out of the perforations it has been found that the pins will not only properly enter the perforations under all conditions of operation and without any tendency to displace or tear the superimposed sheets or webs, but at the same time will insure effective alignment of the same, both during the feeding and printing operations, thereby maintaining the corresponding characters, lines, or markings of the different webs or forms in proper registry one with another. Furthermore, with such a method it is not necessary to enlarge the perforations to facilitate entrance of the pins into the same as is required where the pins are moved on an arc of a circle when approaching the sheet and the perforations therein. Moreover by making the perforations relatively small the edge of the sheet will not be unduly weakened and will not be likely to tear when subjected to strain. A further advantage of moving the sheet feeding links or elements at right angles to the sheet to position the pins within the perforations, is that a number of the pins may be moved into a plurality of the perforations at the same time, as indicated in Fig. 15. This not only insures perfect alignment of the sheets but more evenly distributes the pressure exerted thereon by each link, by reason of the different points of contact of the pins with the sheets thus reducing the tendency of the pins to tear the sheets and affording smooth and uniform advancement of the same and at the same time preventing the shifting of one relative to another.

The flanges 44 of the angle bars 43, except where they are cut away, serve to support the upper flights of the endless carriers whereby to insure movement of the links having the sheet feeding pins in a path parallel to the sheet when said links are moving between the axes of the rotary supporting disks of the chains. However, in order to prevent sagging of the sheet feeding links at any point of operation, a supporting plate 65 is mounted on the pivot pins 45 and 45a, Fig. 6, in alignment with the feeding links and with the opening 66 between the channels 39 and 40 through which the feed pins project, as shown in Figs. 3 and 5. The supporting plate 65 is held against lateral movement on each pivot pin 45 and 45a in one direction by the enlarged portions 67 and 67a thereof and in the opposite direction by the spacing members 68 and 68a on the pins, as shown in Fig. 6. The supporting plate 65 has a cut out portion 65a at its center to permit it to straddle the sprocket shaft 55, as shown in Fig. 3, and has its ends rounded, as also shown in Fig. 3, to facilitate movement of the feed links 60 around said ends.

While a driving sprocket 54 is shown mounted on the shaft 55 for each of the chains 53 and 53a, it will be understood that if desired one of the sprockets may be omitted, since if one chain is positively driven the other will be operated by the feed links interposed between and connected with the chains, as previously described.

However, if preferred, the driving sprockets 54, instead of being placed centrally of the chain as shown, may each be substituted for one of the rotary supporting disks of the chain for operation to drive the chain, in which case only one supporting disk would be required for each chain.

The endless carriers 53 and 53a instead of being in the form of chains, as shown, may constitute belts or conveyors of any preferred type, although if desired other suitable means may be employed for supporting and moving the elements having the sheet engaging parts in a manner to support said parts at right angles to the sheets during movement of the same into and out of the perforations of the sheets.

It will be noted that the axes of the sprocket shaft 55 and of the rotary disks for supporting the chains are all aligned one with another, or in other words in the same plane, which tends to insure smoothness of operation of the moving parts and to make it possible to provide a very compact feeding unit and one which will require but little space and which can be conveniently mounted to operate in connection with different classes of printing, writing, sheet cutting and other machines. However, the axes of the rotary members may be arranged in different planes if desired and the feeding elements designed to maintain the sheet engaging parts at right angles to the sheet during movement of said parts into and out of the perforations of the sheet. While it is preferred to rotatably mount the chain supporting disks, if desired, they may be fixed relative to the channels, in which case they will serve as fixed guides around which the chains or other endless carriers may be moved.

The feeding unit 38 is mounted on a pair of rods 69 as best shown in Fig. 2. The sprocket shaft 55 for operating the sprockets for driving the chains 53 and 53a may be applied by inserting it through a slot in the frame member 70 and through an opening in a supporting member 71, thence through the side walls of the channels 39 and 40 and into another supporting member 72.

The rods 69 are suitably connected with the supporting members 71 and 72, said members each being slidably mounted in a pair of guides 73 and 74, respectively. The inner guides 73 are suitably connected with the frame member 70 and the outer guides 74 with the side frame member 75, Figs. 2 and 7. The frame members 70 and 75 are supported by a base plate 76 which in turn is carried by a rectangular base frame 77. Connected with the base frame 77 are front, rear, and side cover plates 78, 79, and 80, respectively, which taken with the base plate 76 and the top cover plate 82 serve as a casing to enclose the parts of the machine below the plane in which the sheets A are fed, the top of the sheet feeding unit being preferably made flush with the work table or cover plate 82, as shown in Fig. 7.

The purpose of mounting the supporting rods 69 of the feed unit on the slidably mounted supports 71 and 72 is to provide for adjustment of the sheet feeding unit longitudinally of the machine in order to properly position it relative to the printing apparatus or other machine, or relative to other parts of the machine with respect to which it may be found desirable to adjust the same.

The means for adjusting the sheet feeding unit longitudinally of the machine comprises a feed screw 83 rotatably supported in the front wall 78 of the casing containing the feeding unit, said screw being threaded in a transverse bar 84 suitably connected with the outer ends of the slidable supports 71 and 72 as by means of the screws 85, Figs. 2 and 7. By turning the screw 83 in the proper direction the sheet feeding unit may be readily moved forwardly or rearwardly as required to move the sheet feeding unit with respect to the printing line of the machine, in the present embodiment.

The sheet feeding unit is also mounted for adjustment transversely of the machine which is made possible by reason of the fact that the unit is free to slide on the supporting rods 69, as well as on the sprocket shaft 55. The means for adjusting the sheet feeding unit on the sprocket shaft 55 and the rods 69 comprises a feed screw 86, the outer end of which is rotatably disposed in the slidable support 72 and the inner end of which is threaded within a lug 87a depending from one of the channels of the feeding unit 38. The frame plate 75 and the side wall 80 of the casing are slotted to permit the feed screw 86 to move with the sheet feeding unit when the latter is moved longitudinally of the machine.

The purpose of adjusting the sheet feeding unit transversely of the machine is to accommodate it to sheets of different widths which it may be desired to feed through the machine, or sheets having the perforations therein positioned at different distances from the edges of the sheets, as illustrated, for example, by the different sheets shown in Figs. 16 to 20, inclusive, or in order that the feed pins may be properly aligned with the perforations of the sheets when the sheets are to be fed with said perforations spaced at different distances from the type or printing characters.

Another advantage of mounting the feeding unit for lateral adjustment is to permit it to be moved out of operating position or out of the way in case it may be desired to use the machine to print on non-perforated sheets or sheets to be advanced through the machine by means of feeding mechanism other than that shown.

Since the feeding unit 38 is to be maintained flush with the top of the work table or cover plate 82 and is adjustable laterally of the machine, that portion of the cover plate extending between the slidably mounted supports 71 and 72 has been formed of a plurality of separate detachable strips 87, said strips being supported by oppositely disposed ledges 88 on the work table or cover plate 82, Fig. 1. The strips 87 are each cut away at 89 to permit them to be raised and removed by the fingers when desired. When removing any one of the strips to permit the feeding unit to be adjusted into alignment with the space occupied thereby, said strip may be placed in position to occupy the space previously occupied by the upper face of the feeding unit.

In order to maintain the sheets in proper relation upon the upper surface of the feeding unit during advancement of the sheets by the feeding pins, a guide bar 90 of channel-shaped construction is allowed to rest on the sheet in position to straddle the feeding pins 60a, as shown in Figs. 1, 3, and 5. The guide bar has an upstanding lug 91 to which is pivotally connected an arm 92 which in turn is pivotally connected with a rod 93, the opposite ends of which are connected with suitable supports 94 and 94a connected, respectively, with the laterally extending portion 11b of the casing 11 and one of the side walls of the central portion of the casing, as shown in Fig. 1. It will be understood that the guide 90 may be readily moved to inoperative position by swinging the arm 92 to a position at which it will rest on the casing extension 11b.

The driving means for the sprocket shaft 55 includes a short shaft 95 having one end supported by a bearing 96 on the frame member 70 and the other end extended through and suitably supported in a bearing 96a, on the frame member 70a, Figs. 2 and 7. The shafts 55 and 95 have fixed thereon gears 55a and 95a, respectively, the former being driven by the latter through the medium of an intermediate gear 97 supported by a pair of links 98 and 98a, carried by the shafts 55 and 95, as shown in Figs. 7 and 8. It will be understood that when adjusting the sheet feeding unit longitudinally of the machine that the sprocket shaft 55 will be moved therewith at which time it will travel in the slot 70b of the frame member 70 and that by reason of the links 98 and 98a the intermediate gear 97 will be maintained in mesh with gears 55a and 95a so that the shaft 55 may be driven at any position to which it may be adjusted, one of which is indicated by the dotted line positions of the links 98 and 98a shown in Fig. 8.

Figure 10:
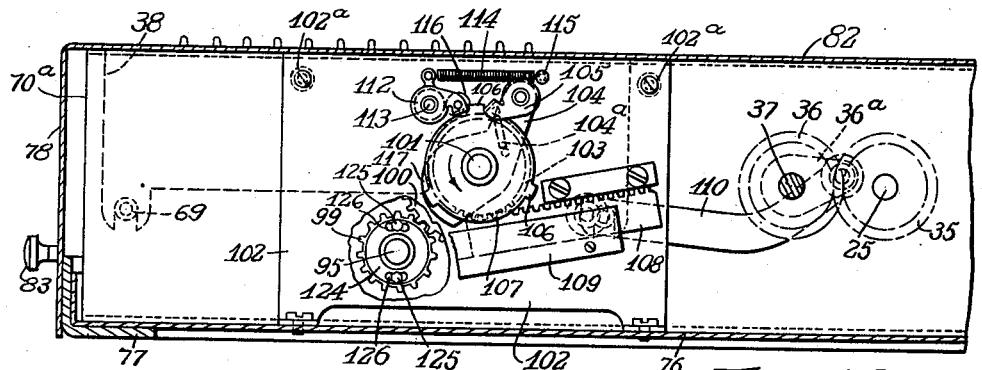
Fig. 10 is a longitudinal fragmentary sectional elevation taken substantially on line 10—10 of Fig. 2, and illustrating the ratchet mechanism for operating the sheet feeding means.

The outer end of the shaft 95 has thereon a driving gear 99 in mesh with a gear 100 fixed on a stub shaft 101 journaled in suitable bearings, not shown, on the frame member 70a and on a supporting plate 102 spaced from the frame member by the cross rods 102a and suitably connected with the base plate 76 as shown in Figs. 2, 7, and 10. Loosely mounted on the shaft 101 is a gear 103 to which is connected an oscillating member 104 having an actuating dog 105 pivoted thereon for engaging any one of the lugs or projections 106 of a driving disk 107 fixed on and adapted to rotate the shaft 101. Meshing with the gear 103 is a rack 108 slidably supported by a channel-shaped guide 109 suitably connected with the supporting plate 102. Pivotally connected with the rack is one end of an operating link 110, the opposite end of which is pivotally connected with the crank arm 36a fixed on the shaft 37 for controlling the type positioning mechanism, the shaft 37 being connected with and driven by the setting clutch shaft 25 through the medium of the gears 35 and 36, as previously stated.

The driving disk 107 is provided with an overthrow dog 112 for normally engaging one of the lugs 106 of the disk, as shown in Fig. 10. The overthrow dog is pivotally mounted on a supporting member 113 carried by the supporting plate 102, as best shown in Figs. 2 and 7. The overthrow dog is normally maintained in operating position by a spring 114 having one end connected therewith and the opposite end connected with a stud 115 on the supporting plate 102. The overthrow dog carries a roller 116 for engagement with a cam 117 formed on the oscillating member 104 having the actuating dog 105 for driving the disk 107. The actuating dog 105 is normally held in engagement with one of the lugs 106 of the driving disk 107 by a spring 104a, as shown in Fig. 10.

It will now be seen that in the operation of the machine, after the operator has properly positioned a perforated sheet within the machine and on the feed pins as previously described, and the trip bar 13 is depressed, that connection will be established between the clutch 32 and the clutch shaft 25 to effect operation of the shaft 37 for controlling the type positioning means, in the manner described in my copending application. At this time the crank arm 36a will be driven by the shaft 37 to advance the link 110 from the position shown in Fig. 10 to that shown in Fig. 11. Upon advancement of the link 110 the rack 108 will rotate the gear 103 which in turn will move the oscillating member 104 from the position shown in Fig. 10 to that shown in Fig. 11, during which operation the actuating dog 105 will pass over the lug 106 in the path thereof, after which it will be snapped into the position shown in Fig. 11 by the spring 104a. Upon movement of the oscillating member 104 to the position shown in Fig. 11 the cam 117 on the oscillating member 104 will engage the roller 116 of the overthrow dog 112 to release the latter as shown in Fig. 11.

Figure 11:
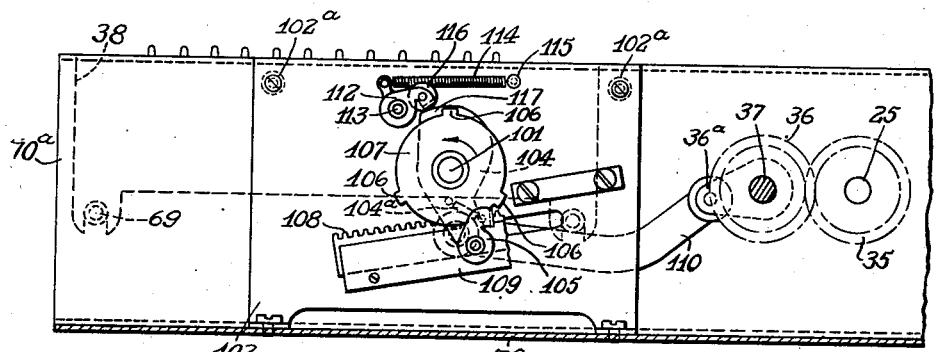
Fig. 11 is a similar view showing the gear actuated rack and other parts of the ratchet mechanism in advanced position ready to actuate the drive gear for the feed unit upon the return stroke of the actuating rack.

As previously pointed out, in the present embodiment, after the type has been positioned at the printing line, the clutch 32 is temporarily disabled, therefore it will be seen that the crank arm 36a actuated by the setting clutch shaft 25 will also temporarily remain in the position shown in Fig. 11, that is, it will be held in this position during the operation of the printing clutch 26 or while the impression is being made on the portion of the sheet at the printing line. After the impression mechanism has completed its cycle of operation, the clutch 32 is again engaged to effect rotation of shaft 37 to move the link 110, thereby returning the rack 108 to the position shown in Fig. 10, during which time the actuating dog 105, through engagement with one of the lugs 106 of the disk 107, will rotate the disk back to the position in Fig. 10, whereby the disk is made to rotate the shaft 101 to effect rotation of the shaft 95 which in turn will rotate the sprocket shaft 55 to actuate the endless carriers 53 and 53a and the sheet feeding links connected therewith to advance the sheet a distance equal to the stroke of the rack 108. Upon return of the rack to the position shown in Fig. 10 the oscillating member 104 will again be actuated by the gear 103 at which time the cam 117 will release the overthrow dog 112 for return to normal position in time to engage the lug 106 advanced by the actuating dog 105 when the latter is returning to normal position. It will be understood that the operations just described will be repeated each time the trip bar 13 is depressed.

While with the operating mechanism shown and described, the sheet feeding unit will effect a step by step advancement of the sheet or a plurality of sheets, it will be understood that the construction of the feeding unit is such as to permit it to be continuously operated whereby a sheet or a plurality of webs may be continuously fed through the machine or advanced any predetermined distance desired. It will be further understood that the sheet feeding unit may be connected with and operated in timed relation to and by machines other than printing machines such, for example, as a machine for cutting sheets in various lengths or for performing other classes of work.

Figure 12:
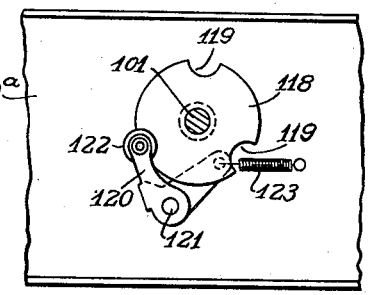
Fig. 12 is a sectional elevation substantially on line 12—12 of Fig. 2, and illustrating the means for centering and yieldingly holding the driving disk in the different positions to which it is moved.

Means is provided for centering and holding the shaft 101 and the driving disk 107 thereon at the positions to which they are moved by the rack 108, which comprises a disk 118 fixed on the inner end of the shaft 101 and having notches 119 corresponding in number and position to the lugs 106 of the driving disk. A bell crank lever 120 pivoted on a stud 121 extending laterally from the frame member 70a is provided with a roller 122 adapted to enter the notches 119 of the disk 118, as shown in Fig. 12, when the driving disk 107 is rotated from one position to another by the actuating dog 105 on the oscillating member 104. A spring 123 is connected with the bell crank lever and serves to actuate the same to move the roller 122 into position within one of the notches 119 each time the driving disk 107 is moved from the position shown in Fig. 11 to that shown in Fig. 10.

In the use of a feeding device of the character described, it is important to permit adjustment of the feed pins with relation to the perforations in the sheet. Such sheets are usually positioned in the machine so that the printing or other operation is performed at one or more predetermined points thereon. However, the relation between the subject matter on the forms and the perforations formed therein will not always be the same, especially when different sets of forms are used.

It will be understood that various operations may be performed on a continuous web or a plurality of superimposed perforated sheets or forms including printing, cutting and slitting the same. Such forms are usually provided with printed matter and with spaces adapted to be filled in by printing apparatus, so that it becomes necessary to accurately position the sheets relative to the type in order that the printing operations may be performed at the desired points. Since this is true it is essential that means be provided for adjusting the feeding elements in their plane of operation to properly position them with respect to the punched openings of the sheets when the latter have been accurately positioned relative to the type or printing line. Furthermore, it is well known that certain inaccuracies develop in the production of continuous forms, and even after the forms are made up the material will expand or contract due to variations in the temperature and moisture conditions to which the sheets may be subjected from time to time. Such uncontrollable conditions also make it advisable to provide means for adjusting the feeding elements in their path of travel to accommodate them to the perforations of the sheets to be advanced thereby. To this end the carriers 53 and 53a, which support the series of feeding elements, are arranged to be moved simultaneously in the desired direction. The gear 99 on the drive shaft 95 is normally held rigid upon a driving disk 124 pinned to the shaft 95, through the medium of the bolts 125 passing through oppositely disposed slots 126 in the driving disk 124, the bolts being threaded in the gear 99 as shown in Figs. 2 and 10. Since the bolts 125 normally serve to connect the gear 99 with the disk 124, rotation of the gear 100, meshing with the gear 99 will operate the shaft 95 to drive the feed unit. In the event it is desired to shift the sheet feeding elements as above described to align them with the perforations in the sheets, or to align or properly position the sheets relative to the operating point of the printing apparatus, the bolts 125 can be loosened to free the shaft 95 to permit the operating parts of the feeding elements, including the endless carriers 53 and 53a, to be moved forwardly or rearwardly the desired amount to align said feeding elements with the perforations of the sheets. When the desired adjustment has been made the bolts 125 can be tightened to rigidly connect the gear 99 with the driving disk 124.

In Figs. 16 to 21, inclusive, a number of fragmentary views of webs or forms have been shown by way of illustration to indicate a variety of conventional punched sheets having perforations variously located, which may be accurately fed to the printing apparatus shown by the improved feeding device embodied in Figs. 3 to 6, inclusive. In Fig. 16, for example, the perforations A' of the sheet A are located along one edge of the sheet as also shown in Fig. 1. While the spaced perforations are shown along the left side edge of the web, it is obvious that they may be formed in the opposite edge thereof. In Fig. 17 the spaced perforations B' of the web B are disposed a considerable distance from the side edge portions of the sheet. Furthermore, the sheets shown are each provided with weakening lines to facilitate tearing the forms apart.

Fig. 18 shows a plurality of superimposed webs or forms C of varying widths with the perforations C' disposed along the left side edge thereof. In Fig. 19, two separate webs or forms D are shown in overlapping relation, the overlapping portions being provided with spaced perforations D'. The web or sheet E shown in Fig. 20 is provided with two rows of perforations E'. In this instance a pair of the feeding units may be employed to advance the sheets, said units being diagrammatically shown at 38a and 38b, the units each corresponding to the unit 38 shown in Figs. 3, 4, and 5.

In Fig. 21, a modified form of punched web is shown wherein a single perforation is provided between the forms as, for example, on the tearing or weakening line between the forms, said perforations each being adapted to receive one of the parts 58a of the modified sheet advancing elements 58, as shown in Figs. 13 and 22. This modification provides that certain of the feeding elements of the endless carriers 53 and 53a be omitted, or in other words, that said elements be spaced to accommodate them to the spacings F' of the sheet F.

It will be understood that the sheets can be readily placed in position within the machine by the operator merely by inserting the first check or form to be printed in proper relation to the printing line and to the feeding pins or elements so that the latter will engage the sheets within the perforations thereof, as shown in Figs. 1 and 3. After the sheets are positioned within the machine as described, the guard 90 can be lowered into position upon the same, as shown in Fig. 1, at which position it will serve to maintain the sheet or sheets in proper position upon the feeding means and to guide the same during the step by step advancement thereof by the ratchet mechanism shown in Figs. 10 and 11, the operation of which has previously been described.

After the sheet has been inserted within the machine the keys corresponding to the characters to be applied to the sheet will be depressed, after which the trip bar 13 will also be depressed to condition the operating mechanism controlled thereby to effect setting of the selected type at the printing line and also advancement of the impression mechanism, and also advancement of the web or sheet to position the next succeeding check or form at the printing line.

I claim:
1. Means for aligning and feeding continuous perforated sheets, comprising a plurality of endless carriers, spaced rotatably mounted supporting members for each carrier, the supporting members of said carriers being spaced corresponding distances apart and those of one carrier being positioned a predetermined distance in advance of those of another carrier, a plurality of sheet feeding devices each pivotally connected with said carriers for advancement thereby, means on said devices for engaging the sheets in the perforations thereof to advance the sheets in a predetermined direction, and operating means for the carriers.

2. Means for aligning and feeding perforated sheets, comprising a pair of endless carriers, spaced rotatably mounted supporting members for each carrier, the supporting members of said carriers being spaced corresponding distances apart and those of one carrier being positioned a predetermined distance in advance of those of the other carrier, a plurality of sheet feeding devices each having one end pivotally connected with one carrier and the other pivotally connected with the other carrier, said devices each being of a length corresponding substantially to the distance between a supporting member of one carrier and the corresponding supporting member of the other carrier whereby said devices are maintained substantially in parallel relation in all positions thereof, said devices each having one or more pin-like members thereon for engaging the sheet in the perforations thereof and cooperating to advance the sheet in said predetermined direction, and means for operating the carriers to effect movement of the sheet feeding devices.

3. Means for aligning and feeding perforated sheets, comprising a casing having a longitudinally extending opening in one wall thereof, a pair of endless carriers within the casing positioned a predetermined distance one in advance of another, supporting means for each of the carriers mounted within the casing, a plurality of members pivotally connected with said carriers, the distance between the axes of each member being substantially equal to the distance one of the carriers is advanced relative to the other, said members having parts adapted to project through said opening and to successively engage the sheet in the perforations thereof during operation of the carriers whereby to advance the sheet in a predetermined direction, and operating means for the carriers.

4. Means for aligning and feeding perforated sheets, comprising a casing having a longitudinally extending opening in one wall thereof, a pair of endless carriers within the casing positioned a predetermined distance one in advance of another, rotatable supporting means for each of the carriers mounted within the casing, a plurality of links connected with said carriers, the distance between the axes of each link being substantially equal to the distance one of the carriers is advanced relative to the other, said links having parts adapted to project through said opening and to successively engage the sheet in the perforations thereof during operation of the carriers whereby to advance the sheet in a predetermined direction, means for operating the carriers including a device disposed within the casing and having an actuating member extending therefrom, and means within the casing for supporting the links against displacement during operation.

5. A unitary device for aligning and feeding perforated sheets, comprising a frame, a pair of endless carriers, means on the frame for supporting said carriers in spaced relation and one at a predetermined distance in advance of another, a plurality of links disposed between said carriers each having one end pivotally connected with one of said carriers, said links each having a part thereon for engaging the sheet in a perforation thereof to effect advancement of the sheet, said endless carriers operating said links to move the sheet engaging parts thereon into and out of the perforations substantially at right angles to the sheet, and operating means for said carriers.

6. Apparatus for aligning and feeding perforated sheets, comprising a frame provided with a sheet receiving portion, a device on the frame having a part for engaging the sheet in a perforation thereof to advance the sheet in a predetermined direction on said receiving portion, means for operating said device to move said part into and out of said perforation at substantially right angles to the sheet, said device serving to move said part during advancement of the sheet thereby in substantially a straight line, supporting means for said frame, and means for adjusting the frame to different positions upon the supporting means.

7. Apparatus for aligning and feeding perforated sheets, comprising means for supporting a sheet for movement substantially in a plane, a device having a laterally projecting part for engaging the sheet in a perforation thereof to advance the sheet substantially in said plane, means including a pair of endless carriers between which said device is positioned for movement in a continuous path and substantially in parallel relation to said plane when moving it toward and from the same so as to cause said part when being moved into and out of operating position within said perforation to remain substantially at right angles to said plane, and means for adjusting said carriers in the planes of movement thereof and relative to the sheet supporting means.

8. Apparatus for aligning and advancing perforated sheets, comprising a frame, a support mounted on the frame for adjustment in different directions, feeding mechanism for the sheet carried by the support and comprising a device having a part for engaging the sheet in a perforation thereof to advance the sheet, separate operating elements mounted on the support for movement in unison one adjacent another, said device being connected with each of said elements for movement thereby to advance the sheet to a predetermined position, and means for adjusting the support on the frame in said different directions.

9. Apparatus for aligning and feeding perforated sheets, comprising a frame, a sheet feeding unit adjustable on the frame and comprising endless carrier means and a shaft for driving the same, said endless carrier means having a member connected therewith for operation thereby and including a part for engaging the sheet in a perforation therein to advance the sheet to a predetermined position relative to the frame, means for adjusting said unit to different positions on the frame, and flexible operating means for the shaft adapted to drive the same at the different positions to which it may be moved by adjustment of said unit.

10. Apparatus for aligning and feeding perforated sheets, comprising a frame, a sheet feeding unit adjustable on the frame and including endless carrier means and a shaft for driving the same, said endless carrier means having a member connected therewith for operation thereby and including a part for engaging the sheet in a perforation therein to advance the sheet to a predetermined position on the frame, means for adjusting said unit to different positions on the frame, and operating means for the shaft including a driving element and gearing connecting it with said shaft and operable to drive the shaft at the different positions to which it may be moved by adjustment of said unit on said frame.

11. Apparatus for aligning and feeding one or more strips of record material, the strip being provided with preformed regularly spaced apertures comprising a plurality of strip engaging and feeding members, means including endless carriers and means interconnecting said members with said carriers for advancing said members to advance the strip of record material and simultaneously feed said members into and out of the preformed apertures in a direction substantially perpendicular to the strip, and means for operating said carriers.

12. Apparatus for aligning and feeding one or more strips of record material, the strip being provided with preformed regularly spaced apertures comprising a plurality of strip engaging and feeding members, devices for supporting said members, at least one of said members being mounted on each of said devices, and means including carriers for supporting and moving said members in a manner such that said members move into and out of the preformed apertures in a direction substantially perpendicular to the strip, said devices being spaced so that at times during the feeding of said strip the members on at least two different devices are at least partially located in the preformed apertures at the same time.

13. Apparatus for aligning and feeding one or more strips of record material, the strip being provided with preformed regularly spaced apertures comprising a surface on which a strip is supported and over which it is advanced to a predetermined position, a plurality of strip feeding devices each having a part rigid therewith and movable to and from a position out of said preformed apertures to a position beyond said surface and into the preformed apertures, means for moving said parts into and out of said preformed apertures while maintaining said parts at a constant angle to the plane of the strip, and means for intermittently advancing said devices parallel to said surface.

14. Apparatus for aligning and feeding one or more strips of record material, the strip being provided with preformed regularly spaced apertures comprising a plurality of endless carriers, strip aligning and advancing devices connected with said carriers for movement thereby, said devices each including a part rigid therewith for engaging the strip within a preformed aperture thereof to effect movement of the strip in a predetermined direction, said endless carriers being so constructed and arranged as to maintain said parts at substantially right angles to the plane of movement of the strip during movement of said parts into and out of said preformed apertures, the said endless carriers maintaining said parts in alignment with each other and moving said parts in substantially a straight line during advancement of the strip thereby, said devices being spaced so that at times during the feeding, of said strip the parts on at least two different devices are at least partially located in the apertures at the same time.

15. Apparatus for aligning and feeding one or more strips of record material, the strip being provided with preformed regularly spaced apertures comprising a surface on which the strip is supported and over which it is advanced to a predetermined position, a device having a part for engaging the strip in a preformed aperture thereof to advance the strip in a predetermined direction, spaced operating elements mounted on one side of said surface for movement in unison, said device being disposed between and pivotally connected with each of said elements for movement thereby to move said part to and from a position on one side of the surface to a position beyond said surface and in strip engaging position to advance the strip in a predetermined direction, and means for actuating said operating elements.

16. Apparatus for aligning and feeding one or more strips of record material, the strip being provided with preformed regularly spaced apertures comprising a surface on which the strip is supported and over which it is advanced to a predetermined position, a pair of endless carriers positioned on one side of said surface, one of said carriers being displaced with respect to the other, a plurality of strip feeding devices each having a part movable into and out of a preformed aperture, each of said strip feeding devices being pivotally connected to each of said endless carriers for movement thereby, and means for operating said endless carriers to project said parts to and from a position on said side of the surface to a position beyond said surface and into registry with the preformed apertures in the strip, said devices being spaced so that at times during the feeding of said strip the parts on at least two different devices are at least partially located in the preformed apertures at the same time.

17. Apparatus for aligning and feeding one or more strips of record material, the strip being provided with preformed regularly spaced apertures comprising a pair of endless carriers, one of said carriers being displaced with respect to the other, a plurality of strip feeding devices each having a part movable into and out of a preformed aperture, each of said strip feeding devices being pivotally connected to each of said endless carriers for movement thereby, and means for operating said endless carriers to project said parts to and from a position in registry with the apertures in the strip, said devices being spaced so that at times during the feeding of said strip the parts on at least two adjacent devices are at least partially located in the apertures at the same time.

18. Apparatus for aligning and feeding one or more strips of record material, the strip being provided with preformed regularly spaced apertures comprising a surface on which the strip is supported and over which it is advanced to an operating position, a pair of endless carriers positioned on one side of said surface, one of said carriers being displaced with respect to the other, a plurality of strip feeding devices each having a part movable into and out of a preformed aperture, each of said strip feeding devices being pivotally connected to each of said endless carriers for movement thereby, means for operating said endless carriers to project said parts to and from a position on said side of the surface to a position beyond said surface and into registry with the preformed apertures in the strip, and means for supporting said endless carriers at at least three spaced points whereby said parts are maintained in the apertures until withdrawn.

19. Apparatus for aligning and feeding one or more strips of record material, the strip being provided with preformed regularly spaced apertures comprising a surface on which the strip is supported and over which it is advanced to a predetermined position, a pair of endless carriers supported on one side of said surface, one of said carriers being displaced with respect to the other, a plurality of strip feeding devices each pivotally secured to both of said carriers in a manner and position such that said strip feeding devices are maintained substantially parallel to each other and to said surface as they are carried around by said carriers, a member extending from each of said devices and movable as said devices are advanced to a position beyond said surface and into a preformed aperture, the members on said devices being maintained in alignment with each other by said carriers and in the desired line of the apertures so that when the members are moved to a position such that they engage in the preformed apertures the strip is aligned. said members moving into and out of the preformed apertures while they are maintained substantially perpendicular to the plane of the strip, and means for moving said carriers to advance the strip.

20. An apparatus as set forth in claim 19, wherein means are provided on the other side of said surface for engaging the strip and maintaining it against said surface in a position to receive said members.

21. Apparatus for aligning and feeding one or more strips of record material, the strip being provided with a single row of preformed regularly spaced apertures comprising a surface on which the strip is supported and over which it is advanced to a predetermined position, a plurality of spaced strip feeding devices each movable to and from a position on one side of said surface to a position beyond the surface and into one of said preformed apertures, and means including carrier means for maintaining said devices in alignment and moving them into and out of said preformed apertures while they are maintained substantially perpendicular to the strip, said devices being spaced and said carrier means moving said devices so that at least two of said devices spaced a distance apart greater than the distance between adjacent preformed apertures are in the apertures at all times during advancement of the strip whereby the strip is maintained in alignment both in a direction along the row of apertures and in a direction perpendicular to said row of apertures, and means for operating said carrier means to advance the strip along said surface.

22. An apparatus as set forth in claim 21, wherein means are provided on the other side of said surface for engaging the strip and maintaining it against said surface in a position to receive said devices.

23. Apparatus for aligning and feeding one or more strips of record material, the strip being provided with a single row of preformed regularly spaced apertures comprising a surface on which the strip is supported and over which it is advanced to a predetermined position, a pair of endless carriers mounted one in advance of the other on one side of said surface, a plurality of strip feeding devices having parts movable to and from a position on said one side of said surface to a position beyond said surface and into said apertures as the carriers are moved, said devices each being pivotally secured to each of the carriers, the pivot points of each of said devices being spaced apart a distance corresponding to the distance of advance of one carrier with respect to the other, whereby said devices are maintained as they are moved with the carriers parallel with each other and parallel to the said surface when said parts are moved into and out of the apertures, said parts being held by said carriers in alignment, and said parts being spaced in a manner such that more than two of said parts spaced apart a distance greater than the distance between adjacent preformed apertures are maintained in the apertures at all times during advancement of the strip whereby the strip is maintained in alignment both in the direction along the line of the row of apertures and in a direction perpendicular to said row of apertures, and means for operating said carrier means to advance the strip along the surface.

24. Apparatus for aligning and feeding one or more strips of record material, the strip being provided with preformed regularly spaced apertures comprising a pair of endless carriers arranged adjacent one another, spaced supporting members for each carrier, said supporting members of one carrier being spaced with respect to those of the other carrier, a plurality of aligning and advancing devices arranged longitudinally between said carriers and each having its opposite ends connected to the different carriers, means on said devices for engaging the strip in the apertures thereof to advance the strip in a predetermined direction, said aligning and advancing devices being adapted to be advanced by said endless carriers to successively engage said strip within the apertures thereof to effect movement of the strip in said predetermined direction, said devices being spaced so that at least at times during the feeding operation the strip engaging means on at least two of said devices are at least partially located in the perforations and operating means for said endless carriers.

25. Apparatus for aligning and feeding one or more strips of record material, the strip being provided with preformed regularly spaced apertures comprising a pair of carriers arranged adjacent one another, spaced supporting members for each carrier, said supporting members of one carrier being displaced with respect to those of the other carrier, a plurality of aligning and advancing members having means adapted to engage in the apertures to advance said strip in a predetermined direction, said members being arranged longitudinally between said carriers and each having one end pivotally connected to one of said carriers and the opposite end thereof pivotally connected to the other carrier, and means for operating said carriers in unison so as to maintain said aperture engaging means in substantially parallel relation in all positions of movement thereof and to cause said members to move successively into and out of said aperture in a direction substantially perpendicular to the plane of movement of said strip in said predetermined direction, said members being spaced so that at least at times during the feeding operation the aperture engaging means on at least two of said members are at least partially located in the apertures.

26. Apparatus for aligning and feeding one or more strips of record material, the strip being provided with preformed regularly spaced apertures comprising a pair of endless carriers arranged adjacent one another and each provided with spaced lateral projecting portions extending towards the adjacent carrier, supporting means for each carrier, said supporting means of one carrier being displaced with respect to that of the other carrier, a plurality of strip advancing members arranged longitudinally between said carriers and adapted to be moved into and out of the apertures of said strip to advance same in a predetermined direction, said advancing members each having one end pivotally connected to a lateral projecting portion of one of said carriers and the opposite end thereof pivotally connected to a lateral projecting portion of the other carrier, and means for operating said carriers so as to successively move said strip advancing members into and out of said apertured strip in a direction substantially perpendicular to the plane of movement of said strip in said predetermined direction, said strip advancing members being spaced apart a distance such that at times during the feeding operation adjacent members are located in the apertures at the same time.

27. In a strip feeding mechanism, in combination, a flexible carrier having a strip feeding part disposed to lie along the path of strip feed and a part deviating therefrom, a succession of feed pins rotatably mounted on said carrier and positioned for engagement with the strip at said strip feeding carrier part to effect strip feed, and means operating simultaneously with feeding action of the pins at said strip feeding part of the carrier for rotatably adjusting said pins as they advance at said deviating carrier part to cause them while moving into strip engagement to move at substantially the same speed as the strip as fed by said strip feeding carrier part.

28. In a strip feeding mechanism, in combination, a flexible carrier, means for driving said carrier along a path having a curved part and a part tangential to said curved part to effect strip feed, a succession of feed pins mounted on said carrier and positioned for engagement in feeding relation with the strip and means operative during strip feeding movement of said pins at the tangential path part for tilting said pins relatively to the carrier so as to cause them to move in parallelism with themselves along said curved path part during entry thereof into strip feeding engagement.

29. In a machine of the character described, in combination, strip feeding mechanism including a flexible carrier movably mounted to effect strip feed and having a strip feed part lying along the strip path and an adjacent part deviating therefrom, a plurality of feed pins longitudinally spaced along the carrier for rotation thereon and positioned for feeding engagement with the strip at the part of the carrier lying along the strip path, certain of said pins being in feed transmitting engagement with the strip while other said pins are being adjusted relatively to the strip, and means for serially rotatably adjusting said other pins in the planes of their advancement at said deviating path part so as to cause the pins to enter or leave the strip at said deviating path part while travelling at substantially the same speed as the feeding strip.

30. In strip feeding mechanism, in combination, a flexible carrier mounted for strip feeding movement and having a strip feeding part positioned along the path of strip feed and a part deviating from the strip path, a succession of feed pins having mounting for rotary adjustment on said carrier relatively thereto on an axis transverse to the plane of movement of said flexible carrier, said pins being spaced along the flexible carrier so as to engage the strip in feeding relation at said strip feeding carrier part, and means for rotatably adjusting said pins on their said rotary mountings while the pins are passing along said deviating path part to said strip feeding path part to position them for entry into strip feeding engagement at said deviating path part while the strip is being fed by said pins positioned at said strip feeding part of the flexible carrier.

31. In strip feeding mechanism, in combination, a carrier chain of flexibly connected links mounted for strip feeding movement and having a strip feeding part positioned along the path of strip feed and a part deviating from the strip path, a succession of feed pins having rotary mounting on the respective chain links for rotary adjustment relatively to the links in the plane of movement of the longitudinal axes of the pins, said pins being spaced along the chain so as to engage in strip feeding relation in feed apertures longitudinally spaced along the strip at said strip feeding part of the chain, and means for rotatably adjusting said pins with relation to the respective mountings on the links in said plane of pin movement as the pins are carried by said carrier chain along said deviating chain part to position them in alignment with respective strip apertures, and to cause them to enter the apertures as they pass along said deviating chain part while the strip is being fed by said pins positioned at said strip feeding part of the chain.

32. In a machine of the character described, in combination, strip feeding mechanism including a series of feed pins for feeding engagement in a series of longitudinally spaced strip apertures, a movable carrier carrying said feed pins in an endless path having a part adjacent to the strip path at which the pins have feeding engagement with said strip apertures and having a part deviating from the strip path, said pins being rotatably mounted on said carrier on axes transverse to the plane of movement thereof, and an adjusting device for rotatably adjusting said pins on their said axes into alignment with the respective strip feed apertures and to cause the entering pin parts to travel substantially at the speed of the advancing strip as they travel along said deviating path part into aperture engagement at said adjacent path part.

33. In a strip feeding mechanism, in combination, a flexible carrier having a strip feeding part disposed to lie along the path of strip feed and a part deviating therefrom, a succession of feed pins rotatably mounted on said carrier and positioned for engagement with the strip at said strip feeding carrier part to effect strip feed, and means operating simultaneously with feeding action of the pins at said strip feeding part of the carrier for rotatably adjusting said pins as they advance at said deviating carrier part to cause them to move substantially perpendicular to the path of movement of the strip during actual entry thereof into strip feeding engagement.

34. Apparatus for aligning and feeding one or more strips of record material adapted to be moved through a path of movement, the strip being provided with performed regularly spaced apertures comprising, in combination, an endless carrier having a path of travel, a portion thereof being substantially parallel to the path of movement of the strip and a portion thereof deviating from said substantially parallel portion, a plurality of strip feeding elements rotatably mounted on said endless carrier, means for controlling and positively guiding the strip feeding elements during their movement through both the parallel portion and the deviating portion of the path of travel of the carrier, said means controlling and rotating the strip feeding elements at the deviating portion in a manner such that prior to the entry thereof into strip feeding engagement said elements are successively moved into a position substantially normal to the path of movement of the strip, are moving substantially at the same rate of speed as the strip, are positively retained in said normal position throughout movement of the elements through the parallel portion of the path of travel of the carrier, and are positively rotated at the end of the parallel path of movement of the carrier so that said elements move out of the apertures in a direction normal to the path of movement of the strip, said elements being spaced along the carrier so that and the parallel portion of the path of travel of the carrier being of such extent that at least two of said elements lie in strip feeding position at the same time.

WALTER B. PAYNE.